US006991261B2

(12) United States Patent
Dronzek, Jr. et al.

(10) Patent No.: US 6,991,261 B2
(45) Date of Patent: Jan. 31, 2006

(54) LABELS WITH REMOVABLE SECTION FOR IN-MOLD PRODUCTION OF IN-MOLD LABELED MOLDED CONTAINERS

(75) Inventors: Peter J. Dronzek, Jr., Thornwood, NY (US); Wallace J. Zychowski, Norway, MI (US); Jeffrey P. Bau, Iron Mountain, MI (US)

(73) Assignee: Multi-Color Corporation, Watertown, WI (US)

( * ) Notice: Subject to any disclaimer, the term of this patent is extended or adjusted under 35 U.S.C. 154(b) by 0 days.

(21) Appl. No.: 09/888,121

(22) Filed: Jun. 22, 2001

(65) Prior Publication Data

US 2003/0008082 A1 Jan. 9, 2003

(51) Int. Cl.
*B42D 15/00* (2006.01)

(52) U.S. Cl. ............................ 283/81; 40/310; 40/638; 206/459.5; 283/101; 428/43

(58) Field of Classification Search .................. 40/310, 40/638; 206/459.5, 831; 283/51, 81, 98, 283/101; 428/40.1, 42.3, 43
See application file for complete search history.

(56) References Cited

U.S. PATENT DOCUMENTS 3,110,121 A 11/1963 Corrinet
5,103,583 A 4/1992 VanErmen
5,151,309 A 9/1992 Dollinger
5,172,936 A 12/1992 Sullivan et al. ............... 283/81
5,238,720 A * 8/1993 Volkman .................... 264/509
5,344,305 A 9/1994 McKillip
5,409,754 A * 4/1995 Yasuda et al. ................ 40/306
5,585,193 A 12/1996 Josephy et al. ............. 428/515
5,711,839 A * 1/1998 Dronzek, Jr. .......... 156/244.11
5,849,419 A 12/1998 Josephy et al.
5,925,208 A 7/1999 Dronzek, Jr. ............... 156/257

FOREIGN PATENT DOCUMENTS

EP 0587178 * 3/1994
WO WO 92/07347 * 4/1992

* cited by examiner

*Primary Examiner*—Monica S. Carter
(74) *Attorney, Agent, or Firm*—Hedman & Costigan, P.C.

(57) ABSTRACT

Labels having a permanent section and at least one removable coupon section are made from polymeric sheets or rolls suitable for printing and forming, at high rates of production, blown or injection in-mold labeled plastic containers are based on a polymeric white opaque, transparent, translucent or contact clear substrate monoaxially oriented and having a thickness in the range of 0.002 to 0.008 inches. The polymer film is reverse pattern-printed with an abhesive coextensive with the detachable portion then overcoated on the container-facing side with a continuous coating of heat activatable adhesive. Such sheet or roll can be printed and then cut into individual labels for affixing to the container as part of a in-molding process. Recyclable containers are provided at high speed without missing labels or doubled labels due to feeding problems. The labels are firmly adherent, except for the removable coupon, and squeeze-release resistant and the indicia, because, in clear and contact-clear versions, are viewable through the labels themselves, are protected against spillage and abrasion.

17 Claims, 2 Drawing Sheets

LABELS WITH REMOVABLE SECTION FOR IN-MOLD PRODUCTION OF IN-MOLD LABELED MOLDED CONTAINERS

FIELD OF THE INVENTION

This invention relates to labels having a removable section, the labels being particularly adapted for use with printing processes for the in-mold labeling of injection- or blow-molded plastic containers. More particularly, the present invention relates to two-part, one removable and the other permanent, labels for use in printing processes of white opaque, transparent, translucent or contact clear films having a heat activatible adhesive on one side and, under the adhesive, a patterned anti-adhesive (abhesive) coating corresponding to the removable section so as make labels from which a section ultimately can be readily removed, the labels in the meantime being functional through the entire label converting and molding process.

BACKGROUND OF THE INVENTION

Plastic containers or bottles are prevalent today in a wide variety of shapes and sizes for holding many different kinds of materials such as light duty liquids (e.g., dishwashing detergent), heavy duty liquids (e.g., laundry detergents), motor oil, vegetable oil, herbicides, etc. Generally, these containers are fabricated from layers or a plurality of layers of plastic, particularly polypropylene, polyethylene and polyesters, by means of blow molding or injection molding.

Generally, such containers are provided with a label which designates the trade name of the product and may contain other information as well. In some instances, the label is merely attached to the container after molding by means of adhesive or the like. However, the label may also be attached to the container during the container molding process. This technology by which the label is associated with the container during the molding operation is generally referred to as an in-mold label process.

Methods and articles describing same are known for performing in-mold labeling of a plastic container. For example, Dronzek, Jr., U.S. Pat. Nos. 5,711,839 and 5,925,208, in the name of one of the applicants herein, and commonly assigned, teach that polymeric sheets or rolls suitable for printing and forming, at high rates of production, blown or injection in-mold labeled plastic containers if made from a polymeric transparent, translucent or contact clear substrate, preferably monoaxially or biaxially oriented, and having a thickness in the range of 0.002 to 0.008 inches which is reverse printed and overcoated on the container-facing side with a heat activatable adhesive and coated or extruded on the opposite side with an antistatic and/or slip coating. Optionally, these Patents teach that such sheets or rolls can be printed and then cut into individual labels for affixing to the container as part of an in-molding process. Recyclable containers are provided at high speed without missing labels or doubled labels due to feeding problems. The labels are firmly adherent, and squeeze-release resistant and the indicia, because they are viewable through the labels themselves, are protected against spillage and abrasion.

Also relevant for its teachings, regarding in-mold labeling with a removable coupon portion, is Sullivan et al, U.S. Pat. No. 5,172,936, the label having a permanent portion and a removable portion, a printed face, and an adhesive-coated back, the permanent areas of the label having a degree of adhesion resulting in a permanent bond and the removable areas being covered with an adhesive with a lower degree of adhesion so as to allow the removable portion to be removed from the surface. The labels provided by the teachings of U.S. Pat. No. 5,172,936 are not made by a process which uses, as its final step, overcoating the patterned adhesive with the permanent adhesive. Moreover the removable portions are disclosed to tend to wrinkle, crease and blister. It would be desirable to eliminate such shortcomings, while at the same time providing a coupon which is different in use and appearance, but maintains all functional advantages.

Also relevant for its teachings with respect to machine-direction oriented label films and die-cut labels prepared therefrom is Josephy et al, U.S. Pat. No. 5,585,193, which discloses labels prepared from a multilayer composite cast extruded and oriented in the machine direction. The composite also comprises an adhesive layer for adhering the label to a substrate. The advantage provided by such composites is improved die-cuttability.

The present state of the art thus shows that white opaque, transparent, translucent, clear or contact clear polymeric films having judiciously selected characteristics of thickness, specific gravity and coefficient of expansion and contraction and provided with a heat activatable adhesive coating have improved and surprising characteristics of adhesion to in-mold blown plastic containers with resistance to damage from cracking, tearing, creasing, wrinkling or shrinking due to physical abuse and flexing of the plastic container material. Furthermore, it has been shown in U.S. Pat. No. 5,192,936 that labels with removable coupons can be provided from polymeric face stock by pattern printing with a permanent adhesive the area to be permanently affixed and pattern-printing with a lesser strength adhesive with selectively removable features under the coupon-removable area. This patent teaches the use of less adhesive, a different adhesive or a modified adhesive to achieve the desired objectives. In addition, the prior art teaches, in U.S. Pat. No. 5,585,193, that using a machine-direction oriented film improves the die-cuttability of labels prepared from such films.

It has now been found that making an in-mold label having a removable coupon portion is unexpectedly improved if the film used is oriented uniaxially in the machine direction and is axially in line with the direction of tear when the coupon is ultimately removed.

It has also been found that the process for making the labels with removable features is simplified, and an improved coupon is obtained, if a patterned “abhesive” (i.e., an anti-adhesive; non-stick, anti-adherent properties) is laid down on the substrate in the shape of the coupon and the entire side facing the in-mold article is overcoated with the permanent adhesive to insure that there is no wrinkling or creasing in the removable area making a permanent bond between the adhesive and the container interface.

Accordingly, a principal object of the present invention is to provide for the use of surface- or backside-printable polymeric sheets or rolls to make labels for in-mold use without the problems discussed above. It is a further object of the invention to provide a method for in-mold labeling of hollow plastic containers using printed labels made from such sheets. It is still another object of the invention to provide articles labeled with printed labels which have the unexpectedly superior properties described above.

These and other objects of the invention will become apparent from the present specification.

BRIEF DESCRIPTION OF THE DRAWINGS

In the drawings:

FIGS. 2*a*–2*c* show magnified cross sections of the container 2 and the label 4, both with the label 4 attached to the container 2 and with the coupon 6 partially removed. FIG. 2*a* shows air 12, abhesive 14, and coupon 6. FIG. 2*b* shows container 2, adhesive 10, air 12. FIG. 2*c* shows container 2, adhesive 10, abhesive 14, and label 4.

SUMMARY OF THE INVENTION

Figure 1:
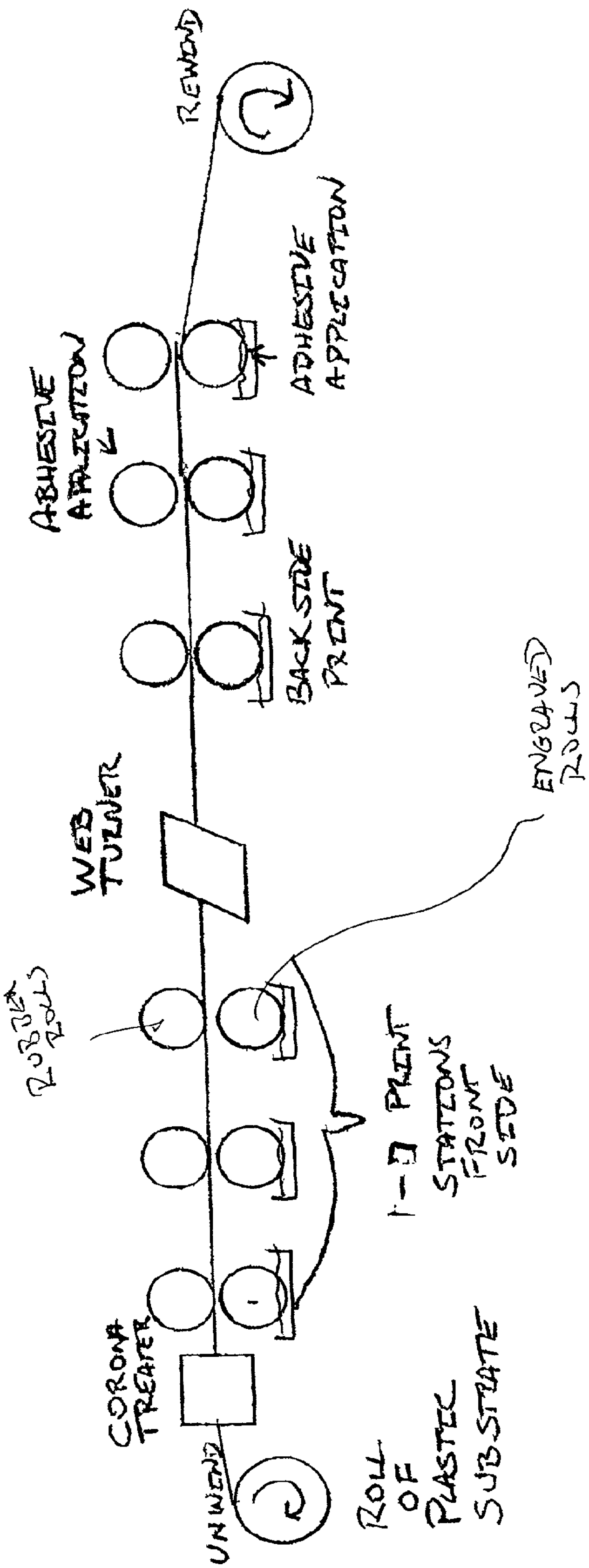
FIG. 1 is a flow diagram of a process employed to make sheets or rolls from which to die-cut labels according to the present invention.

According to this invention, there is provided a label having at least one removable section and at least one permanent section, the removable section being defined by two or more discontinuities spaced apart on an edge of the label, the label being made from a polymeric film that is uniaxially oriented in the machine direction, and the discontinuities being located so that a line which is extended to connect the discontinuities is substantially perpendicular to the axis of orientation of the polymeric film.

In preferred labels:

- the polymeric film is selected from a monolayer film or an extrusion-cast multilayer film, the monolayer film and the multilayer film being uniaxially-oriented and the multilayer film comprising at least one skin layer and a core layer, each of the layers being formed from at least one polymer, the monolayer films and the multilayer films also being selected from films which are surface printable and films which are capable of being rendered surface printable, and having a thickness between 0.002 and 0.008 inches;
- those wherein the monolayer film comprises one selected from any of polypropylene, polyethylene or polyester;
- those wherein the multilayer film comprises one selected from at least one skin layer comprising any of polypropylene, polyethylene and polyester, a core layer comprising any of polypropylene, polyethylene and polyester, and at least one skin layer comprising any of polypropylene, polyethylene and polyester;
- such labels in which the polymeric film comprises a monolayer or multiple coextruded layers selected from opaque or clear virgin olefin homopolymer, opaque or clear recycled olefin homopolymer, opaque or clear reprocessed olefin homopolymer, opaque or contact clear virgin olefin copolymer, contact clear recycled olefin copolymer, opaque or contact clear reprocessed olefin copolymer or blends of any of the foregoing; and special mention is made of:
- such labels in which the print-receiving face of the polymeric film includes at least one print enhancing surface to enhance the anchorage of ink, the print surface layer comprising a corona-treated, print-receiving surface.

In another of its major aspects, the present invention contemplates, a label having at least one removable section and at least one permanent section, the removable section being defined by two or more discontinuities spaced apart on an edge of the label, the label being made from a polymeric film that is uniaxially oriented in the machine direction, and the discontinuities being located so that a line which is extended to connect the discontinuities is substantially perpendicular to the axis of orientation of the polymeric film;

wherein a print-receiving face of the polymeric film includes at least one print enhancing surface to enhance the anchorage of ink, the print enhancing surface comprising a primer, a product of flame-treatment, corona-treatment or chemical treatment, a coextruded print receiving layer or a combination of any of the foregoing layers; and wherein the permanent and the removable sections are provided with a continuous adhesive layer for anchoring the permanent section to a surface; and wherein the removable section is provided first with a removable-section-defining abhesive layer for stripping the removable section from a surface.

Preferred embodiments include:

- such labels wherein the polymeric film is selected from a monolayer film or an extrusion-cast multilayer film, the monolayer film and the multilayer film being uniaxially-oriented and the multilayer film comprising at least one skin layer and a core layer, each of the layers being formed from at least one polymer, the monolayer films and the multilayer films also being selected from films which are surface printable and films which are capable of being rendered surface printable, and having a thickness between 0.002 and 0.008 inches;
- such labels wherein the monolayer film comprises one selected from any of polypropylene, polyethylene or polyester;
- such labels wherein the multilayer film comprises one selected from at least one skin layer comprising any of polypropylene, polyethylene and polyester, a core layer comprising any of polypropylene, polyethylene and polyester, and at least one skin layer comprising any of polypropylene, polyethylene and polyester;
- such labels in which the polymeric film comprises a monolayer or multiple coextruded layers selected from opaque or clear virgin olefin homopolymer, opaque or clear recycled olefin homopolymer, opaque or clear reprocessed olefin homopolymer, opaque or contact clear virgin olefin copolymer, contact clear recycled olefin copolymer, opaque or contact clear reprocessed olefin copolymer or blends of any of the foregoing; and special mention is made of
- such labels in which the print-receiving face of the polymeric film includes at least one print enhancing surface to enhance the anchorage of ink, said print surface layer comprising a corona-treated, print-receiving surface.

In its embodiments, the invention includes containers having a label as defined above and articles of manufacture having a label as defined above.

DETAILED DESCRIPTION OF THE INVENTION

The terms "virgin", "recycled" or "reprocessed" when used herein and in the appended claims mean, respectively, new resin, reground resin, and resin sheets and the like which have been prepared for other uses, and after-treated to remove coatings, etc.

The term "regrind compatible" when used herein and in the appended claims means that containers with in-mold labels can be reground and molded after being mixed with virgin material. Regrind compatibility is determined by regrinding, mixing and molding.

The term "contact clear" when used herein and in the appended claims means a hazy material difficult to see through, but which, in intimate contact with a surface, transmits an underlying image. Polyethylene films are a common example. Contact clarity is determined by a simple trial and error test.

The terms "primer", "flame-treatment", "corona treatment", and "chemical treatment" when used herein and in the appended claims mean, respectively, a deposited coating for promoting adhesion generally comprising a filled or unfilled polymer, surface activation by carefully exposing to a bank of flames, without burning or distortion, exposure to high voltage direct current to microscopically etch the surface, and carefully etching the surface with chemicals known to be effective for this purpose.

The labels of the invention comprise a substrate which has characteristics substantially similar to the plastic container with which the label is to be used with special reference to the polymers used. This prevents loosening of the label, especially at its edges after the in-mold processing and facilitates recycling.

The substrate film must be oriented. As is well known, cast film can or cannot be oriented, but is usually oriented to a minor degree in the machine direction (MD). Blown film is usually oriented due to the manufacturing process, but is not usually sold as oriented because it is an unbalanced orientation. Extruded film is usually oriented to a major degree, and orientation can be monoaxial or biaxial. Although many such films, monolayered and multilayered, can be used in the present invention, it is important to select and to use monoaxially oriented film as the substrate. The substrate should have "a coefficient of thermal expansion or contraction under the conditions which the container sees the same or substantially the same as that of the plastic from which said container is made." Some variability is permissible, and the characteristic seems to be a factor in preventing lifting of the edges of the in-molded containers bearing the in-mold labels of the invention. Coefficient of thermal expansion or contraction is measured by standard methods, such as by ASTM Method D696, which expresses the values in units of $10^{-6}$ in/in/° C., or in values of %/° C. from which the permissible variations mentioned hereinabove are measured. However, the best test is a practical one: make a test container and subject it to a heat and cooling cycling in a controlled temperature oven. Those combinations of label materials and bottle plastics free of edge lifting are suitable.

A heat activated adhesive is applied from a printing roll, screen, extrusion die, and the like, in a single all-in-one process to a surface of the substrate which will come into contact with the container. Selected inkwork comprising printed indicia will be, as part of the same process, reverse printed on the back surface, i.e., under the adhesive and abhesive for clear or contact-clear labels or on the opposite surface of opaque labels by a printing process as described above or an art-recognized equivalent. Similarly, the abhesive (as well as optional non-coextruded antistatic and/or slip compositions) will be applied from the roll or screen in known ways and when indicia are applied as part of the printing process. If a coextruded substrate is used an antistatic and/or slip layer can be coextruded with the base polymer sheet during the extrusion process and is matched with the adhesive to provide the proper antistatic and slip for optional feeding into the mold. After die-cutting, as will be described later, each individual label will be picked up by high speed machinery of well-known types for positioning in an injection mold or a blow mold prior to container formation. As the container is formed, the adhesive is activated by the heat in the mold and its contents and adheres the label to an outer surface of the container.

The preferred embodiments of the labels of the present invention are fabricated from white opaque extruded, cast or blown films of polyolefin, e.g., polyethylene or polypropylene, or polyester and these may optionally be provided with a print enhancing coating or coextruded layer such as those well known to those skilled in this art. Opaque films are preferred to mask indicia printed on the back side of the removable area so that they are not visible until the coupon is removed. The films can be e.g., provided in rolls which may be printed with conventional label indicia on conventional printing equipment and furthermore can be die cut and applied to plastic containers using conventional in-mold equipment. Although for purposes of exemplary showing, the present invention is described and illustrated in connection with a polyethylene container, it will be understood that in-mold labeling may also be applied in the formation of propylene multi-layer bottles, polyethylene terephthalate bottles and other types of plastic containers formed by blow or injection molding.

The preferred construction of the improved in-mold labels of the present invention uses a solid, i.e., non-multicellular thermoplastic film comprised of a monoaxially extruded polypropylene polymer. Such films are marketed under the name "PRINTRITE®" by Trico Industries, Davisville, R.I., 02854, U.S.A. Preferred multilayered films include PRIMAX® NA-R 400, a corona-treated, semi-rigid matte white polyolefin film, PRIMAX® NA 400, a corona-treated flexible matte white polyolefin film by Avery Dennison, Concord, Ohio 44077, U.S.A. In order to enhance the printing qualities of the thermoplastic film it may be provided with, for example, a print receptive coextruded layer known to those skilled in the art, filled, e.g., lightly filled with clay/calcium carbonate, silica and/or china clay, etc., or, preferably, an unfilled primer coating, such as an acrylic type resin. Typically such primers are available commercially from sources well known to those skilled in this art. For example, polyester primers are marketed by Rohm & Haas, Philadelphia, Pa., U.S.A., and acrylic or polyurethane primers by Neo Resins, Wilmington, Mass. 01887, U.S.A. The coating helps insure that the surface of the film will accept high quality printing and may also improve the abrasion and scuff resistant qualities of the finished label.

The physical properties of the aforementioned monoaxially oriented thermoplastic polypropylene film (PRINTRITE®), are set forth in Table 1:

TABLE 1

| | |
|---|---|
| Density | 0.905 g/cm$^3$ |
| Thickness | 0.0024–0.0038 inches |
| Folding Endurance | Excellent |
| Coefficient of Expansion** | 81–100 × $10^{-6}$ in/in/° C. |
| % Shrink at 212° F., MD, TD | <2% |
| Surface treatment | Corona-discharge |

*MD = machine direction; TD = transverse direction
**Modern Plastics Encyclopedia, October 1989, page 606

A heat activated adhesive is applied to such label sheets in a conventional manner. The use of such coatings for in-mold labels is reviewed in detail by D. H. Wiesman in Tappi Journal, Vol 69, No. 6, June 1986. A preferred adhesive comprises an organic polymeric resin such as an ethylene/vinyl acetate copolymer gel or dispersion. A suitable source of such adhesives is Rohm & Haas Corp. which sells such products under the name "ADCOTE®" 31DW1974 (Solvent-based) and "ADCOTE® 57WW654 (Water-based). Also suitable is a warm melt adhesive designated Product No. S11723 and sold by Selective Coatings & Inks, Inc., Farmingdale, N.J., U.S.A. Before (if reverse printing is employed), applying the adhesive, the film is printed with suitable label indicia in a conventional manner. The adhesive is preferably applied from, for example, a gravure roll, or screen or flexographic plate, so as to produce a continuous coating. It has been found that the printing quality of the present thermoplastic film labels is equivalent to the printing quality of conventional paper labels. Finally, individual labels may be die cut from the sheets or rolls in the conventional manner e.g., by rotary die cutting, by square cutting, and the like.

With respect to printing, although various methods are used in this art to apply information or decorations to plastics, traditional equipment is used herein. To avoid unnecessarily detailed description, reference is made to Modern Plastics Encyclopedia, Mid-October Issue, 1989, "Printing" by Hans Deamer, pages 381–383.

Selection of the printing inks for use, and formation of print-enhancing surfaces and the production of images or indicia are well within the skill of workers in this field. Also, it is easily obvious to the artisan to produce the films of this invention with direct printed and reverse printed indicia on any print-receiving surface and to carry out the printing operation in the stages set forth in the description above. The inclusion of primers for sealing the printed image and to enhance ink and adhesive bonding is also conventional in this art.

The antistatic and/or slip agents preferred if used herein are applied as coatings or as coextruded layers, incorporated in the resin used for the labels. Such coatings are also applied by techniques known to those skilled in this art. For example, a thin coat of antistatic agent can be applied to one surface of the film which may already have been printed in reverse. Suitable such coatings can be selected from the many commercially-available materials known in this art, such as listed, for example in Modern Plastics Encyclopedia, Mid-October Issue, 1987, "Antistatic Agents" by J. L. Rogers, pages 130 and 132, as well as pages 579–581. Preferred for use herein are commercially-available antistatic coating compositions available, for example, from Akzo Chemie America, Chicago, Ill., under the trade name or designation Armostat® Aqueous Ethoquad CY12, from distributors of a product of the successors to Union Carbide Corp., Danbury, Conn., under the trade name or designation Silwet® L-77, a modified silicone, or from Flint Ink, Ann Arbour, Mich. 48105 U.S.A. under the tradename "FLEXCON" a proprietary mixture which is gravure, flexographic and screen applicable or from Process Resources Corp., Thornwood, N.Y., U.S.A. under the tradename or designation PD 945, a mixture which is gravure, flexographic or screen applicable and having the typical properties described in Table 2:

TABLE 2

| | |
|---|---|
| Solids | 4% |
| pH | 8.5–9.5 |
| Viscosity | 10–50 CPS 2/20 RPM @ 77° F. |
| Weight/gallon | 8.5 LBS/GAL |
| Color | Off White |
| Diluent | Water |
| Clean-Up | Water |
| Shelf-Life | 90 Days |

The antistatic coating can be applied as part of the printing process and it may be applied either before or after application of the adhesive layer.

As is shown in FIG. 1, the adhesive layer is preferably put on last, although the adhesive layer can be laid down at an earlier stage. But it is critical to the present invention that the abhesive layer is always put down before the adhesive layer, although intervening steps can be employed. In preferred embodiments, a patterned roller or screen will be used, although preferably just before, as illustrated in the flow diagram in FIG. 1. However, as mentioned above, the abhesive layer can also, if desired, be laid down earlier in the process, as part of printing, backside printing, an independent station, and the like. The abhesive composition employed can be a commercially-available product or can be prepared by one skilled in this art. Presently preferred, is a product sold under the trade designation "FLEXCON ABSEEEAL LACQUER" by Flint Ink, Ann Arbour, Mich. 48105, U.S.A. This composition includes heptane (10–30%), n-propanol (10–30%), hydrotreated paraffin wax and water. See also the teachings regarding water-based, non-silicone-containing slip enhancers in U.S. Pat. No. 5,792,734.

With respect to the coextruded slip layers, migratory slip aids such as fatty acid amides (soaps) can be used in extruded or coextruded layers, such as but not limited to erucamide, oleoamide or steramide. Other types of migratory slip additives are silicone oils. Examples of non-migratory slip aids are talc platelets, silicone spheres or waxes. In any event, migratory, non-migratory, and combinations thereof, can be used as slip agents.

The in-mold labels of the present invention may be utilized on conventional in-mold labeling apparatus in the same manner as conventional paper labels. See, for example, the article in Tappi Journal, cited above.

To save unnecessarily detailed description, devices for performing in-mold labeling on a container, which are well known, are the subject matters of U.S. Pat. No. 3,759,643 to Langecker, 1973, and U.S. Pat. No. 4,479,644 to Bartlmee et al, 1984. In general, all such apparatus use a injection mold or a blow mold having a cavity for containing a hollow body, and a member which is movable toward the cavity. The member includes a section for carrying a label to be placed in the mold during movement of the member toward the cavity. Ventilation openings are provided in the mold for venting any air between the mold and label. Variations in the apparatus that may be employed include using rotating mold units and oscillating means for picking up individual labels and depositing them in the rotating molds at appropriate intervals to automate the process.

Figure 2:
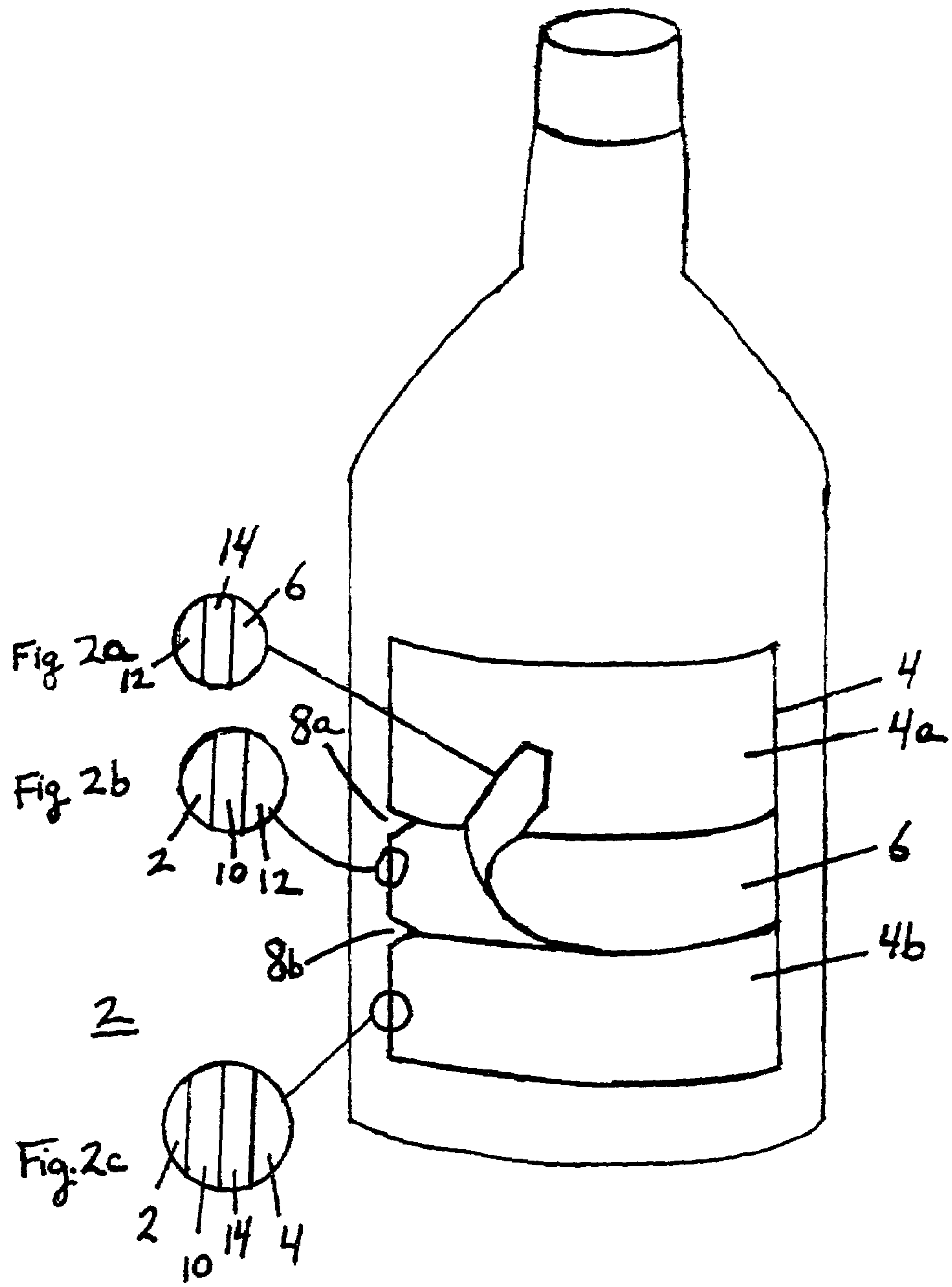
FIG. 2. illustrates, in perspective view, a bottle 2 labeled in accordance with the present invention, the label 4 having permanent sections 4*a* and 4*b* and having removable section 6 partially pulled away, facilitated by notches 8*a* and 8*b*.

A labeled bottle in accordance with the invention is shown in FIGS. 2 (2*a*, 2*b* and 2*c*) and has been explained in detail above.

The patents, applications, publications and test methods mentioned above are incorporated herein by reference.

Many variations of the present invention will suggest themselves to those skilled in the art in light of the above detailed description. For example, instead of virgin oriented polypropylene as the face film, virgin poly(ethylene terephthalate), polyamide, polyethylene, polycarbonate, fluoropolymers and polyimide films can be used. Instead of 0.007 inch polyester film, 0.004 inch polyester film can be used. Instead of ethylene/vinyl acetate as the heat activated adhesive layer, low density polyethylene can be used. Instead of an acrylic printing enhancing coating, another coating, such as a polyester or urethane resin, can be printed in selected areas on the print receiving face of the polymeric sheet or roll. Instead of a polyethylene container, a polypropylene container or a polyester container, the labels can be applied to containers made by injection molding or by blow molding single or multi-layers of barex, cellulose acetate, cellulose acetate butyrate, cellulose acetate propionate, ionomer resin, K-resin, polystyrene and polyvinyl chloride.

Polypropylene labels can be put on polyethylene containers and polyethylene labels can be put on polypropylene containers.

As antistatic agents of the nonionic type there can be used ethoxylated, propoxylated or glycerol compounds. Alkyl amines can be used as antistats of the amine type. Alkyl ammonium quaternary salts can be used as antistats of the quaternary type. The antistats can be applied in the gravure, flexographic or screen printing process as an aqueous and/or alcoholic solution at 1 or 2% concentration, by weight.

Instead of a single layer label, the labels can comprise two, or more, layers. For example, the outer layer can comprise a reverse printed transparent substrate, comprising at least one layer, through which the indicia is viewed, and this can be laminated to at least one second film (transparent or opaque), and which is unprinted, but which bears the heat activatable adhesive layer, the second film having all of the thermodynamic characteristics required for the first, and serving to anchor the composite label to the blow molded container.

All such obvious modifications are within the full intended scope of the appended claims.

What is claimed is:

1. A label having a front side and a back side and at least one tear-removable section and at least one permanent section, said removable section consisting essentially of a part of said label which is defined by two or more notches spaced apart on the same edge of said label, said label being made from a polymeric film that is uniaxially oriented in line with the direction in which said tear-removable section is to be removed by stretching in the machine direction in which said polymeric film is uniaxially oriented only, and said notches being located so that a line which is extended to connect said notches is substantially perpendicular to the axis of orientation of said polymeric film and said notches being located at the interface of the permanent and removable sections wherein said permanent section and said removable section are provided with a continuous adhesive layer which completely covers the outermost surface of said back side of the label, said removable section having on its back side an abhesive on the area of said removable section that is below said continuous adhesive layer.

2. A label as defined in claim 1, wherein said polymeric film is selected from the group consisting of a monolayer film and an extrusion-cast multilayer film, said monolayer film and said multilayer film being uniaxially-oriented and said multilayer film comprising at least one skin layer and a core layer, each of said layers being formed from at least one polymer, said monolayer films and said multilayer films also being selected from the group consisting of films which are surface printable and films which are capable of being rendered surface printable, and having a thickness between 0.002 and 0.008 inches.

3. A label as defined in claim 2, wherein said monolayer film comprises one selected from the group consisting of any of polypropylene, polyethylene and polyester.

4. A label as defined in claim 2, wherein said multilayer film comprises one selected from the group consisting of at least one skin layer comprising any of polypropylene, polyethylene and polyester, a core layer comprising any of polypropylene, polyethylene and polyester, and at least one skin layer comprising any of polypropylene, polyethylene and polyester.

5. A label as defined in claim 2, wherein said polymeric film comprises a monolayer or multiple coextruded layers selected from the group consisting of opaque or clear virgin olefin homopolymer, opaque or clear recycled olefin homopolymer, opaque or clear reprocessed olefin homopolymer, opaque or contact clear virgin olefin copolymer, contact clear recycled olefin copolymer, opaque or contact clear reprocessed olefin copolymer and blends of any of the foregoing.

6. A label as defined in claim 2, wherein the print-receiving face of said polymeric film includes at least one print enhancing surface to enhance the anchorage of ink, said print surface layer comprising a corona-treated, print-receiving surface.

7. A label having a front surface and a back surface and at least one tear-removable section and at least one permanent section, said removable section being defined by two or more notches spaced apart on an edge of said label, said label being made from a polymeric film that is uniaxially oriented in line with the direction in which said tear-removable section is to be removed by stretching in the machine direction in which said polymeric film is uniaxially oriented only, and said notches being located so that a line which is extended to connect said notches is substantially perpendicular to the axis of orientation of said polymeric film;

wherein a print-receiving face of said polymeric film includes at least one print enhancing surface to enhance the anchorage of ink, said print enhancing surface comprising a primer, a product of flame-treatment, corona-treatment or chemical treatment, a coextruded print receiving layer or a combination of any of the foregoing layers;

wherein said permanent and the removable sections are provided with a continuous adhesive layer on the back surface for anchoring the permanent section to a surface; and wherein the removable section is provided first with a removable-section-defining abhesive layer for stripping the removable section from a surface.

8. A label as defined in claim 7, wherein said polymeric film is selected from the group consisting of a monolayer film and an extrusion-cast multilayer film, said monolayer film and said multilayer film being uniaxially-oriented and said multilayer film comprising at least one skin layer and a core layer, each of said layers being formed from at least one polymer, said monolayer films and said multilayer films also being selected from the group consisting of films which are surface printable and films which are capable of being rendered surface printable, and having a thickness between 0.002 and 0.008 inches.

9. A label as defined in claim 8, wherein said monolayer film comprises one selected from the group consisting of any of polypropylene, polyethylene and polyester.

10. A label as defined in claim 8, wherein said multilayer film comprises one selected from the group consisting of at least one skin layer comprising any of polypropylene, polyethylene and polyester, a core layer comprising any of polypropylene, polyethylene and polyester, and at least one skin layer comprising any of polypropylene, polyethylene and polyester.

11. A label as defined in claim 8, wherein said polymeric film comprises a monolayer or multiple coextruded layers selected from the group consisting of opaque or clear virgin olefin homopolymer, opaque or clear recycled olefin homopolymer, opaque or clear reprocessed olefin homopolymer, opaque or contact clear virgin olefin copolymer, contact clear recycled olefin copolymer, opaque or contact clear reprocessed olefin copolymer and blends of any of the foregoing.

12. A label as defined in claim 11, wherein a print-receiving face of said polymeric film includes at least one print enhancing surface to enhance the anchorage of ink, said print enhancing surface comprising a primer, a product of flame-treatment, corona-treatment or chemical treatment, a coextruded print receiving layer or a combination of any of the foregoing surfaces.

13. A label as defined in claim 12, wherein the print-receiving face of said polymeric film includes at least one print enhancing surface to enhance the anchorage of ink, said print surface comprising a corona-treated, print-receiving surface.

14. A container having a label according to claim 2.

15. A container having a label according to claim 8.

16. An article of manufacture having a label according to claim 2.

17. An article of manufacture having a label according to claim 8.

* * * * *

UNITED STATES PATENT AND TRADEMARK OFFICE

CERTIFICATE OF CORRECTION

PATENT NO. : 6,991,261 B2
APPLICATION NO. : 09/888121
DATED : January 31, 2006
INVENTOR(S) : Dronzek, Jr. et al.

It is certified that error appears in the above-identified patent and that said Letters Patent is hereby corrected as shown below:

Title Page, Item (57)/ABSTRACT:
Line 18, "containers are" should be -- containers and are --.
Line 21, "0.008 inches" should be -- 0.008 inch --.
Line 31, "indicia, because, in" should be -- indicia, in --.
Line 32, "themselves, are protected" should be -- themselves, and thus are protected --.

Column 1,
Line 16, "so as make" should be -- so as to make --.
Line 43, "teach that" should be -- teach --.
Line 43, "0.008 inches" should be -- 0.008 inch --.

Column 3,
Line 33, "0.008 inches" should be -- 0.008 inch --.
Line 57, "contemplates, a" should be -- contemplates a --.

Column 4,
Line 20, "0.008 inches" should be -- 0.008 inch --.

Column 6,
Line 46, "0.0024-0.0038 inches" should be -- 0.0024-0.0038 inch --.
Line 48, "MD, TD" should be -- MD, TD* --.
Line 65, "Before (if reverse printing is employed), applying" should be
-- Before (if reverse printing is employed) applying --.

Column 8,
Line 9, "Presently preferred, is" should be -- Presently preferred is --.

Column 9,
Line 52, "0.008 inches" should be -- 0.008 inch --.

UNITED STATES PATENT AND TRADEMARK OFFICE

CERTIFICATE OF CORRECTION

PATENT NO. : 6,991,261 B2
APPLICATION NO. : 09/888121
DATED : January 31, 2006
INVENTOR(S) : Dronzek, Jr. et al.

It is certified that error appears in the above-identified patent and that said Letters Patent is hereby corrected as shown below:

Column 10,
Line 45, "0.008 inches" should be -- 0.008 inch --.

Signed and Sealed this

Third Day of October, 2006

JON W. DUDAS
*Director of the United States Patent and Trademark Office*